United States Patent [19]

Adams

[11] Patent Number: 4,585,210
[45] Date of Patent: Apr. 29, 1986

[54] SAFETY HARD SEAT

[76] Inventor: Donald L. Adams, P.O. Box T, Tulia, Tex. 79088

[21] Appl. No.: 584,594

[22] Filed: Feb. 29, 1984

[51] Int. Cl.⁴ ............... F16K 31/50; F16K 31/60
[52] U.S. Cl. ................... 251/214; 251/274; 251/330; 251/355; 137/315; 403/2; 403/17; 403/259; 74/548; 74/553; 16/117; 16/DIG. 24; 292/350
[58] Field of Search ............... 251/214, 274, 324, 330, 251/355; 137/797, 315; 403/2, 17, 248, 259; 16/114 R, 117, DIG. 24; 74/548, 553; 292/350

[56] References Cited

U.S. PATENT DOCUMENTS

| | | | |
|---|---|---|---|
| 485,678 | 11/1892 | Ash | 403/248 |
| 622,912 | 4/1899 | Corey, Jr. | 251/81 |
| 1,662,291 | 3/1928 | Bastian | 251/274 |
| 1,944,777 | 1/1934 | Banks | 403/2 |
| 2,608,377 | 8/1952 | Streun | 251/81 |
| 2,732,855 | 1/1956 | Hobbs | 251/330 X |
| 2,887,293 | 5/1959 | Gasche | 251/274 X |
| 3,049,332 | 8/1962 | Webster | 251/274 X |
| 3,055,632 | 9/1962 | Scaramucci | 251/355 X |
| 3,193,243 | 7/1965 | Billington et al. | 251/96 |
| 3,412,750 | 11/1968 | Volpin | 251/330 X |
| 3,809,363 | 5/1974 | Rhodes | 251/355 |
| 3,851,853 | 12/1974 | Teeters | 251/330 X |
| 4,149,558 | 4/1979 | McGee et al. | 251/330 X |
| 4,192,342 | 3/1980 | Adams | 251/293 X |
| 4,240,462 | 12/1980 | Bankstahl | 137/315 X |
| 4,318,422 | 3/1982 | Nakanishi et al. | 251/355 X |
| 4,356,832 | 11/1982 | Velan | 251/330 X |
| 4,431,162 | 2/1984 | Carlson | 251/144 |
| 4,450,856 | 5/1984 | Kocher | 251/274 X |
| 4,456,221 | 6/1984 | Bryant | 251/330 X |
| 4,460,155 | 7/1984 | Smith | 251/144 |
| 4,501,289 | 2/1985 | Pavliukonis | 137/315 |

FOREIGN PATENT DOCUMENTS 359586  2/1962  Switzerland ............... 403/259

Primary Examiner—Samuel Scott
Assistant Examiner—Allen J. Flanigan
Attorney, Agent, or Firm—Wendell Coffee

[57] ABSTRACT

The valve is particularly designed compatible for use with toxic or highly flammable fluids. It has a hard valve stem tip, such as tungsten carbide which is pushed longitudinally against the valve seat and not rotated into sealing position. The valve is provided with a backseat threaded to the valve body so that if the bonnet or packing nut is very seriously abused by the operator even to the extent of twisting or breaking, the valve will not blow out toxic or flammable fluid. Most of the parts of the valve are made of stainless steel and provisions are made for lubricating the working parts of the valve. Notches in the valve stem and packing nut provide for a safe clean break of these parts in the event they are over stressed.

7 Claims, 3 Drawing Figures

U.S. Patent  Apr. 29, 1986  4,585,210
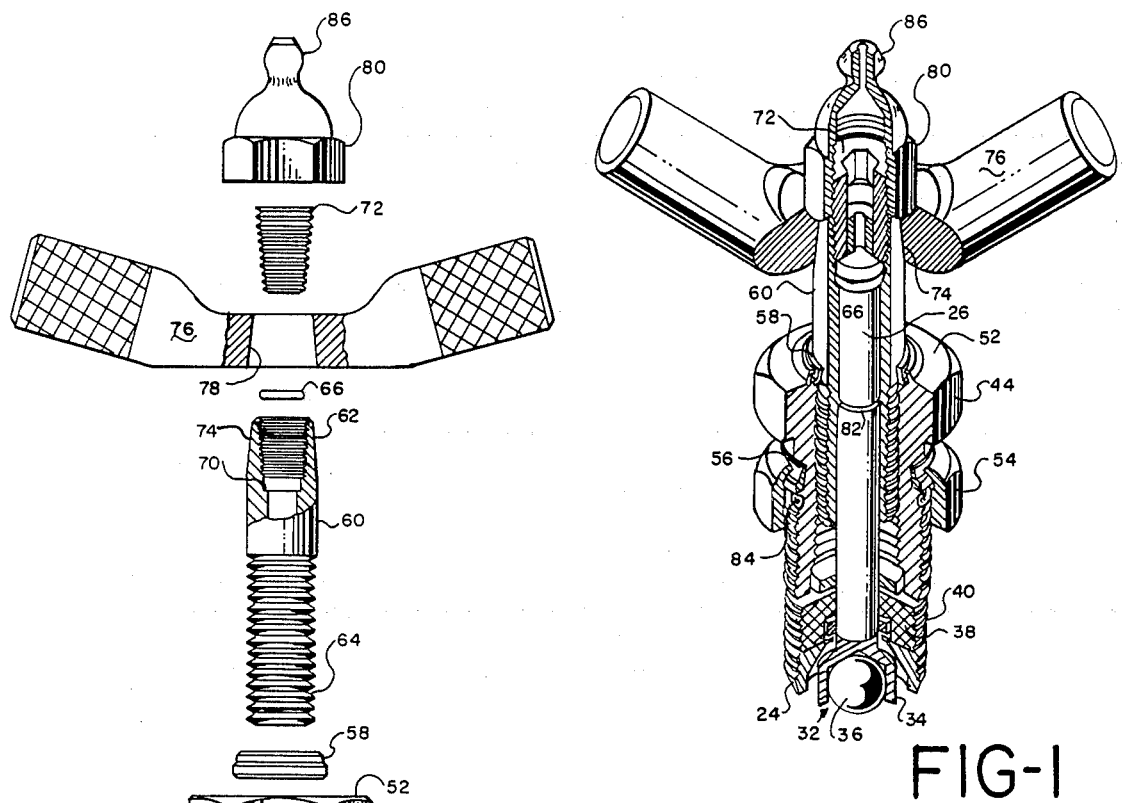
FIG-1
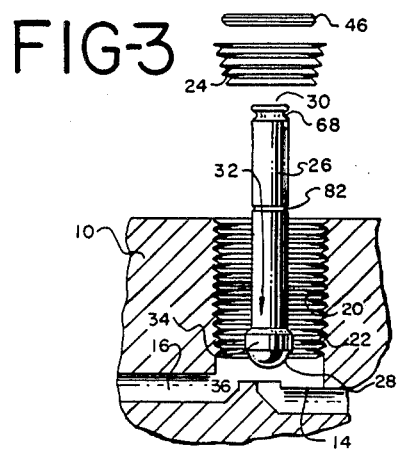
FIG-3
FIG-2

SAFETY HARD SEAT

CROSS REFERENCE TO RELATED APPLICATIONS

None.

BACKGROUND OF THE INVENTION (1) Field of the Invention

This invention relates to a valve with its actuator and more particularly to a reciprocating valve having lubricating means for the actuator as well as loss of motion between the actuator and the valve.

(2) Description of the Prior Art

Before this application was filed, Applicant caused a search to be made in the United States Patent and Trademark Office. The searcher reported the following nine patents:

| | |
|---|---|
| Corey, Jr. | 622,912 |
| Streun | 2,608,377 |
| Hobbs | 2,732,855 |
| Volpin | 3,412,750 |
| Rhodes | 3,809,363 |
| McGee, et al | 4,149,558 |
| Adams | 4,192,342 |
| Nakanishi, et al | 4,318,422 |
| Velan | 4,356,832 |

My prior U.S. Pat. No. 4,192,342 discloses a backseat in the body which, in that particular situation, allows backseating to remove pressure off of the packing, enabling the packing to be serviced while the valve is under pressure.

The other patents appear to be of more general interest only and are reported because the applicant believes the Examiner would be interested in any patents reported by an experienced patent searcher.

SUMMARY OF THE INVENTION (1) New Functions and Surprising Results

I have developed this valve that has the ability to seat the valve without rotating the valve stem. In addition, the valve is particularly safe in the event a workman either tries to force the valve open when it is already open or force it closed when it is already closed. Also, the valve is particularly safe in the event of an impact which breaks off the parts of valve protruding from the body. I.e., the valve may be severely damaged but the fluids flowing within the body will not be released.

In my design, it is possible to make the process wetted parts of the best material for corrosion resistance and still make the parts bearing the load threads out of a different material. It turns out that problems of galling and seizure result in load threads on highly anti-corrosive materials, and metals suited to heavy load bearing threads have very poor corrosion resistance.

A unique feature of this design is that the process wetted inner stem and the highly mechanically stressed outer stem with its load threads are two completely different parts. Each can be made of different metals as required to optimize its performance without affecting the performance of other parts.

Stated otherwise, the valve will withstand severe nonchemical and chemical abuse.

Thus it may be seen that the function of the total combination of parts far exceeds the sum of the functions of the individual parts such as packing nuts, stems, handles, etc.

(2) Objects of the Invention

An object of this invention is to turn on or off the flow of toxic or flammable materials without danger of releasing the fluids to the atmosphere.

Further objects are to achieve the above with a device that is sturdy, compact, durable, lightweight, simple, safe, efficient, versatile, ecologically compatible, energy conserving and reliable, yet inexpensive and easy to manufacture, install, adjust, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 1 is a quarter sectional perspective view of the valve without the valve body.

FIG. 2 is an axial sectional view of one embodiment of the entire valve showing an angled valve body.

FIG. 3 is an exploded axial sectional view with a straight body and with the inner valve stem shortened for clarity.

DESCRIPTION OF THE PREFERRED EMBODIMENT

Referring more particularly to the drawings, there may be seen an embodiment of a valve according to this invention. The body may be a straight body, as shown at 10, in FIG. 3, or the body may be an angled body as shown at 12, in FIG. 2. The angled body of FIG. 2, of course, is adaptable to be rodded in case the valve becomes clogged.

Regardless of whether it is a straight body or an angled body, there will be a body seat 14 which is normally circular or slightly conic. The body seat 14 will have an axis. Should the seat be circular, the axis will be through the center at right angles to the plane of the circle. Outlet passageway 16 extends from the seat to outside the body. Inlet passageway 18 extends from outside the body to the seat 14. Bore 20 in the body is coaxial with the body seat 14. The bore 20 is threaded. The threads close to the body seat, are tapered, as seen at 22. Therefore, it is correct to characterize the threads as being tapered threads in the bore.

Backseat 24 has external tapered threads. The backseat 24 is threaded into the bore 20. A spanner wrench is used to install the backseat coaxial with the body seat 14.

Inner stem 26 has valve end 28 and distal end 30. The inner stem 26 is coaxial with the bore 20 and the body seat 14. The valve end is between the body seat and the backseat. The valve end has valve unit 32 thereon. The valve unit seats against the body seat 14 when the valve is closed and against the backseat 24 when the valve is open. The valve stem 26 extends through the backseat.

A spanner wrench with a hollow bore to accommodate the already installed inner stem is used to install and tighten the taper threaded backseat. The top of the backseat has two blind holes or recesses to mate the two driving pins extending out the end of said spanner wrench. The same wrench is used to screw out the packing if one wishes to replace the packing or to disassemble the valve.

The valve unit 32 includes socket 34 with ball 36 in the socket. In the specific embodiment shown, the ball will seat against the body seat 14 and the back of the socket 34, being a part of the valve unit 32, will seat against the backseat 24.

Many operators prefer to use a ball which is free to rotate within a socket, and the valve in such case is made with a ball of very hard material such as tungsten carbide. However, inasmuch as in my design the valve stem 26 itself does not rotate, it is possible to use a unitary valve unit which is made integral with the valve stem and of the same material as the valve stem.

Packing 38 is inserted into the threaded bore 20. A packing which is machined with packing threads 40 on the outside and a smooth bore snugly fitting the inner stem 26 therethrough may be used. The packing is coaxial with the bore 20 and the body seat 24. The packing has two spanner holes in the top face 42 thereof. The packing 38 is put in the bore 20 and removed from the bore with a spanner wrench. I prefer to use a product of petroleum saturated graphite impregnated fiber material sold under the tradedmark GRAFOIL packing which is of smooth bore I.D. and O.D. It is simply slid over inner stem 26 and into the body until it bottoms out on backseat 24 and lower anti-extrustion washer 46. The upper anti-extrusion washer 48 is next dropped over the inner stem and packing nut 44 is screwed into body and tightened. The force and pressure of the packing nut acting against the a product of petroleum saturated graphite impregnated fiber material sold under the trademark GRAFOIL forces it to flow into and seal the threads of a bore 22. If the product synthetic resin polymer sold under the trademark Teflon packing is used, the packing is prethreaded and screwed into bore 22 with the same spanner wrench used to install the backseat.

Anti-extrusion washer 46 fits around the inner stem 26 between the packing 38 and the backseat 24. Anti-extrusion washer 48 fits around the inner stem between the packing 38 and the packing nut 44.

Packing nut 44 is tubular and has inner end 50 and outer end 52. The inner end 50 has external threads which mate with the threads of the bore 20. The packing nut is coaxial with the bore 20 and with the body seat 24. The external portion of the outer end 52 of the packing nut 44 is in the shape of a hexagonal nut.

The packing nut 44 is locked in position by packing lock means on the packing nut or locking the packing nut to the body 10 or 12. This is in the form of packing lock nut 54 which has the product synthetic resin polymer sold under the trademark Teflon rod wiper 56 on the top thereof. Another the product synthetic resin polymer sold under the trademark Teflon rod wiper 58 is upon the top of the packing nut 44 and wipes and seals the top of the outer stem 60 as will be discussed later. The bore through the packing nut is threaded.

The outer stem 60 has handle end 62 and body end 64. The outer stem is tubular. The outer stem has external threads upon the body end which mate with the internal threads in the packing nut 44. The outer stem is coaxial with the bore 20. The exterior handle end of the outer stem is smooth where the the product synthetic resin polymer sold under the trademark Teflon wiper 58 works against it.

Distal end 30 of the inner stem 26 has circumferential groove 68 therein. Brass snap ring 66 fits within the groove 68. The snap ring is above ledge 70 in the bore of the tubular outer stem which is about halfway between the handle end 62 and the body end 64 of the outer stem 60. The snap ring is on the distal side of that ledge. From the ledge 70 to the handle end, the bore through the outer stem 60 is threaded with tapered threads.

Tubular set screw 72 has tapered external threads which mate with the tapered threads in the bore of the outer stem 60. When assembled, there will be a small clearance between the snap ring 66 and the ledge when the set screw bears against the distal end 30 of the inner stem 26. Stated otherwise, when the snap ring 66 is on the ledge 70, the set screw will have a small clearance between the distal end 30.

The exterior of the handle end 62 of the outer stem has slight taper 74 thereon. Handle 76 has tapered bore 78 therethrough which mates with the taper 74 upon the handle end of the outer stem 60. The handle is held securely in place by handle nut 80 which is threaded through the top of the distal end 30 of the tapered set screw 72. Normally, the handle will rotate the outer stem 60 when the handle is rotated. The threads on the set screw and the internal threads of the outer stem being tapered thus becoming influential in locking the handle on the outer stem. (I.e., as tapered set screw is tightened, it expands outer stem which acts against the tapered bore in handle to further lock the handle to stem.) Two mechanical systems are working together to lock handle: 1. the tapered bore of handle being forced down on tapered portion of outer stem by the handle nut; 2. the outer stem trying to expand outward by action of the tapered set screw pushing outward as it is forced to screw into outer stem. However, it will be understood that if the valve unit 32 is firmly seated upon the body seat, an additional rotation of the handle 76 to continue to close the valve will cause the handle to slip upon the outer stem 60. On the other hand, if the valve unit 32 is against the backseat 24, rotation of the handle will either cause the handle to slip upon the outer stem 60 or if excessive pressure is applied, it will cause the snap ring 66 to shear since the snap ring is made of brass for that purpose. This will cause the outer stem and handle to completely disengage itself from the remainder of the valve. In such an event the fluid within the valve body is contained by the valve unit 32 and backseat 24, as well as the packing 38. Analysis will show that the outer stem 60 does not contain the fluid within the body. Therefore, screwing out the outer stem in no way permits any loss of the fluid contained within the valve.

The inner stem 26 has circumferential notch 82 cut in it outside the body 10. The packing nut 44 also has a circumferential notch 84 cut in the outer end of the packing locking nut 54. Therefore, if the valve in the handle area were subject to some impact the packing nut 44 and the inner stem 26 would shear at the notches 82 and 84. However, regardless of the position of the valve at the time the stem and packing nut were sheared, there would be no loss of fluid from the valve body as discussed above.

A zerk grease fitting 86 is built into the handle nut 80. The valve can be lubricated with a conventional lubrication implement on the zerk fitting 84. The lubrication will flow through the tubular set screw 72 and through the outer stem 60 to between the outer stem and inner stem 26. When the lubrication reaches the washer 48, the flow of the lubrication will be between the threads of the outer stem 60 and packing nut 44. The lubricant will flow to the the product synthetic resin polymer sold under the trademark Teflon rod wiper and flow from the the product synthetic resin polymer sold under the trademark Teflon rod wiper 58. The purpose of the the product synthetic resin polymer sold under the trademark Teflon rod wiper 58 is more to prevent dust and corrosive atmosphere such as air in salt water areas from mixing with the lubricant. The lubricant is to wash or flush throughout the working parts of valve and expel expired and/or contaminated lubricant out of the valve to the atmosphere.

The outer stem works as the handle is rotated with the packing nut. Therefore, I prefer to make the outer stem of a different grade and hardness of stainless steel. However, I prefer that it have the same thermal expansion as the packing nut, so that temperature variations will not cause the valve to move from the seat or to press with greater pressure against the seats.

Except as identified otherwise, I prefer to make all parts of very anti-corrosive material.

The embodiment shown and described above is only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing, the following catalog of elements is provided:

| 10 | body straight | 50 | inner end |
|---|---|---|---|
| 12 | body angle | 52 | outer end |
| 14 | body seat | 54 | packing lock nut |
| 16 | outlet | 56 | a product of petroleum |
| 18 | inlet | | saturated graphite impregnated |
| 20 | bore | | fiber material sold under |
| 22 | tapered threads | | the trademark GRAFOIL teflon |
| 24 | backseat | 58 | a product of petroleum |
| 26 | inner stem | | saturated graphite impregnated |
| 28 | valve end | | fiber material sold under |
| 30 | distal end | | the trademark GRAFOIL teflon |
| 32 | valve end | 60 | outer stem |
| 34 | socket | 62 | handle end |
| 36 | ball valve | 64 | body end |
| 38 | packing | 66 | snap ring |
| 40 | packing threads | 68 | groove |
| 42 | top face | 70 | ledge |
| 44 | packing nut | 72 | set screw |
| 46 | washer | 74 | taper |
| 48 | washer | 76 | handle |
| | | 78 | taper bore |
| | | 80 | handle nut |
| | | 82 | notch |
| | | 84 | notch |
| | | 86 | zerk |

SUBJECT MATTER CLAIMED FOR PROTECTION

I claim as my invention:

1. A safety hard seat valve comprising:
   a. a body,
   b. a body seat with an axis in the body,
   c. an outlet passageway extending from the seat to outside the body,
   d. an inlet passageway extending from outside the body to the seat,
   e. a bore in the body coaxial with the seat,
   f. threads in the bore,
   g. a back seat with external threads screwed into the bore,
   h. an inner stem in the bore and extending through the back seat,
   i. the inner stem having a valve end and distal end,
   j. a valve unit on the valve end of the inner stem,
   k. the valve unit being positioned between the body seat and back seat and adapted to seat against the body seat,
   l. the valve unit also adapted to seat against the back seat,
   m. packing threaded into the bore to sealingly engage against the back seat and around the inner stem,
   n. a tubular packing nut having inner and outer threads,
   o. the packing nut screwed into the bore against the packing and around the inner stem,
   p. packing lock means on the packing nut for locking the packing nut to the body,
   q. a tubular outer stem having a handle end and a body end,
   r. external threads on the body end of the outer stem mated with the inner threads of the packing nut with the inner stem telescoped in the outer stem,
   s. a groove around the distal end of the inner stem,
   t. a ledge in the bore of the outer stem near the handle end of the outer stem,
   u. a snap ring in the groove contiguous with the ledge to limit the telescopic movement of the inner stem in the outer stem,
   v. a set screw threaded into internal threads at the handle end of the outer stem,
   w. the set screw contiguous with the distal end of the inner stem,
   x. a handle over the handle end of the outer stem, and
   y. a handle nut threaded to the threaded set screw and bearing against the handle.

2. The invention as defined in claim 1, further comprising:
   z. an anti-extrusion washer around the inner stem between the packing and the back seat and
   aa. another anti-extrusion washer around the inner stem between the packing and the packing nut.

3. The invention as defined in claim 1, further comprising:
   z. the handle forming a slip friction fit with the handle end of the outer stem.

4. The invention as defined in claim 1, further comprising:
   z. a circumferential notch on the inner stem between the distal end and the packing, and
   aa. a circumferential notch on the packing nut outside the bore,
   bb. so that if the packing nut and inner stem are subjected to excessive stress, they will break at the notches.

5. The invention as defined in claim 1, further comprising:
   z. said handle nut having a grease fitting therein and
   aa. said set screw being tubular,
   bb. so that lubrication can be inserted through the handle nut and through the tubular set screw between the inner and outer stem to the packing and back from the packing around the threads between the outer stem and packing nut.

6. A safety hard seat valve comprising:

a. a body,
b. a body seat with an axis in the body,
c. an outlet passageway extending from the seat to outside the body,
d. an inlet passageway extending from outside the body to the seat,
e. a bore in the body coaxial with the seat,
f. threads in the bore,
g. a back seat with external threads screwed into the bore,
h. an inner stem in the bore and extending through the back seat,
i. the inner stem having a valve end and distal end,
j. a valve unit on the valve end of the inner stem,
k. the valve unit being positioned between the body seat and back seat and adapted to seat against the body seat,
l. the valve unit also adapted to seat against the back seat,
m. packing threaded into the bore to sealingly engage against the back seat and around the inner stem,
n. a tubular packing nut having inner and outer threads,
o. the packing nut screwed into the bore against the packing and around the inner stem,
p. packing lock means on the packing nut for locking the packing nut to the body,
q. a tubular outer stem having a handle end and a body end,
r. external threads on the body end of the outer stem mated with the inner threads of the packing nut with the inner stem telescoped in the outer stem,
s. a groove around the distal end of the inner stem,
t. a ledge in the bore of the outer stem near the handle end of the outer stem,
u. a snap ring in the groove contiguous with the ledge to limit the telescopic movement of the inner stem in the outer stem,
v. a set screw threaded into internal threads at the handle end of the outer stem,
w. the set screw contiguous with the distal end of the inner stem,
x. a handle over the handle end of the outer stem,
y. a handle nut threaded to the threaded set screw and bearing against the handle,
z. said handle nut having a grease fitting therein,
aa. said set screw being tubular,
bb. so that lubrication can be inserted through the handle nut and through the tubular set screw between the inner and outer stem to the packing and back from the packing around the threads between the outer stem and packing nut,
cc. a circumferential notch on the inner stem between the distal end and the packing, and
dd. a circumferential notch on the packing nut outside the bore,
ee. so that if the packing nut and inner stem are subjected to excessive stress, they will break at the notches.

7. A safety hard seat valve comprising:
a. a body,
b. a body seat with an axis in the body,
c. an outlet passageway extending from the seat to outside the body,
d. an inlet passageway extending from outside the body to the seat,
e. a bore in the body coaxial with the seat,
f. threads in the bore,
g. a back seat with external threads screwed into the bore,
h. an inner stem in the bore and extending through the back seat,
i. the inner stem having a valve end and distal end,
j. a valve unit on the valve end of the inner stem,
k. the valve unit being positioned between the body seat and back seat and adapted to seat against the body seat,
l. the valve unit also adapted to seat against the back seat,
m. packing threaded into the bore to sealingly engage against the back seat and around the inner stem,
n. a tubular packing nut having inner and outer threads,
o. the packing nut screwed into the bore against the packing and around the inner stem,
p. packing lock means on the packing nut for locking the packing nut to the body,
q. a tubular outer stem having a handle end and a body end,
r. external threads on the body end of the outer stem mated with the inner threads of the packing nut with the inner stem telescoped in the outer stem,
s. a groove around the distal end of the inner stem,
t. a ledge in the bore of the outer stem near the handle end of the outer stem,
u. a snap ring in the groove contiguous with the ledge to limit the telescopic movement of the inner stem in the outer stem,
v. a set screw threaded into internal threads at the handle end of the outer stem,
w. the set screw contiguous with the distal end of the inner stem,
x. a handle over the handle end of the outer stem,
y. a handle nut threaded to the threaded set screw and bearing against the handle,
z. said handle nut having a grease fitting therein,
aa. said set screw being tubular,
bb. so that lubrication can be inserted through the handle nut and through the tubular set screw between the inner and outer stem to the packing and back from the packing around the threads between the outer stem and packing nut,
cc. a circumferential notch on the inner stem between the distal end and the packing,
dd. a circumferential notch on the packing nut outside the bore,
ee. so that if the packing nut and inner stem are subjected to excessive stress, they will break at the notches,
ff. an anti-extrusion washer around the inner stem between the packing and the back seat,
gg. another anti-extrusion washer around the inner stem between the packing and the packing nut,
hh. the handle forming a slip friction fit with the handle end of the outer stem,
ii. the threads in the bore and the threads on the back seat being tapered, and
jj. the threads on the set screw and the internal threads of the outer stem being tapered.

* * * * *